United States Patent [19]
Ichikawa et al.

[11] Patent Number: 5,211,145
[45] Date of Patent: May 18, 1993

[54] FUEL INJECTION SYSTEM FOR ENGINE

[75] Inventors: Ryuichi Ichikawa; Yu Motoyama, both of Iwata, Japan

[73] Assignee: Yamaha Hatsudoki Kabushiki Kaisha, Iwata, Japan

[21] Appl. No.: 824,167

[22] Filed: Jan. 22, 1992

[30] Foreign Application Priority Data

Jan. 24, 1991 [JP] Japan .................................. 3-7319

[51] Int. Cl.⁵ ...................... F02B 17/00; F02M 67/00
[52] U.S. Cl. ................................. 123/295; 123/73 C; 123/305; 123/661
[58] Field of Search ................... 123/276, 279, 295, 301, 305, 123/531, 533, 73 C, 661

[56] References Cited

U.S. PATENT DOCUMENTS

| | | | |
|---|---|---|---|
| 2,768,615 | 10/1956 | Taylor et al. | 123/305 X |
| 4,492,193 | 1/1985 | Neitz | 123/276 |
| 4,867,128 | 9/1989 | Ragg et al. | 123/531 |
| 5,086,737 | 2/1992 | Watanabe et al. | 123/295 |
| 5,105,795 | 4/1992 | Ozawa et al. | 123/661 |
| 5,123,399 | 6/1992 | Motoyama et al. | 123/531 |

Primary Examiner—Tony M. Argenbright
Attorney, Agent, or Firm—Ernest A. Beutler

[57] ABSTRACT

Several embodiments of fuel injected engines wherein stability and running is achieved by maintaining an injection velocity that is greater than the velocity of the charge in the chamber including that component contributed by the squish action in the engine and at least equal to 40 meters per second so as to ensure effective stratification and the existence of a stoichiometric charge at the spark plugs at the time of ignition, even under low load and speed conditions such as idle.

20 Claims, 11 Drawing Sheets

FUEL INJECTION SYSTEM FOR ENGINE

BACKGROUND OF THE INVENTION

This invention relates to a fuel injection system for an engine and more particularly to an improved fuel injection system and method of injecting fuel into an internal combustion engine to promote stability in running under all conditions.

The advantages of direct cylinder injection for internal combustion engines are well known. By employing direct cylinder injection, it is possible to provide some stratification of the fuel charge, particularly at low and mid range performance, which stratification can significantly improve not only fuel economy but control of exhaust gas emissions, particularly unburned hydrocarbons. However, the amount of fuel injected at idle and low speed is extremely small. If the engine is spark ignited, it must be insured that a stoichiometric mixture is present at the gap of the spark plug at the time of firing.

It has also been realized that the stability of an engine can be significantly improved by having so called "fast burn" of the charge. The advantages of fast burn are particularly prevalent at idle and low speeds when a small fuel charge is present in the chamber. Fast burn can be promoted by incorporating a device for increasing the turbulence in the combustion chamber. One way which turbulence is normally generated is through the use of a squish area that cooperates with a recess or pocket type combustion chamber with the squish charge being transferred at a rapid velocity into the combustion chamber adjacent the time of ignition. However, where the squish action is employed, there is some risk that the fuel charge may be swept away from the spark plug and in stability can result.

It is, therefore, a principal object to this invention to provide a improved arrangement for injecting fuel directly into the combustion chamber of an engine and still maintaining good running and stability under idle and low speed operation.

It is a further object to this invention to provide an arrangement for injecting fuel into an internal combustion engine in such a way so as insure stability even at low and mid range speeds so as to achieve good performance and exhaust emission control.

One form of fuel injection employs not only the injection of fuel under pressure but also the injection of air under pressure. The pressurized air is injected along with the fuel and the air pressure assists in dispersion and vaporization of the fuel particles. However, where air is employed to assist in the fuel injection, the problems associated with stratification and insuring a proper stoichiometric fuel/air mixture in the vicinity of the spark plug at the time of firing are greatly magnified.

It is, therefore, a still further object to this invention to provide an improved air/fuel injection system and method of operating such a system that will provide good stability under all running conditions and particularly under low speed, low load conditions.

SUMMARY OF THE INVENTION

Certain features of the invention are adapted to be embodied an internal combustion engine and method of operating such an engine wherein the engine has a pair of relatively moveable components that define a variable volume chamber and fuel injection means are provided for injecting fuel into the chamber for combustion therein.

In accordance with one feature of the invention, a control arrangement is provided for controlling the pressure of the fuel injected to maintain an injection velocity of at least 40 meters per second of the fuel injected into the chamber.

In another feature of the invention, the engine is operated in accordance with a method wherein the pressure of the fuel injected maintains an injection velocity of at least 40 meters per second of the fuel injected into the combustion chamber.

Other features of the invention are also adapted to be embodied in an internal combustion engine having a pair of relatively moveable components that define a variable volume chamber. This variable volume chamber comprises a recessed area at least in part surrounded by a squish area so that as the volume of the chamber decreases, flow from the squish area will be forced into the recessed area. A fuel injection means is provided for injecting fuel into the recessed area.

In accordance with one aspect of the invention as applied to this type of an engine, means control the pressure of the fuel injected so as to maintain an injection velocity that is at least equal to and preferably greater than the velocity of movement of the charge in the chamber.

In accordance with another aspect of this feature of the invention, the injection is controlled so as to maintain an injection velocity that is at least equal to and preferably greater than the velocity of movement of the charge in the chamber at the time the fuel is injected.

DETAILED DESCRIPTION OF THE PREFERRED EMBODIMENTS OF THE INVENTION

Figure 1:
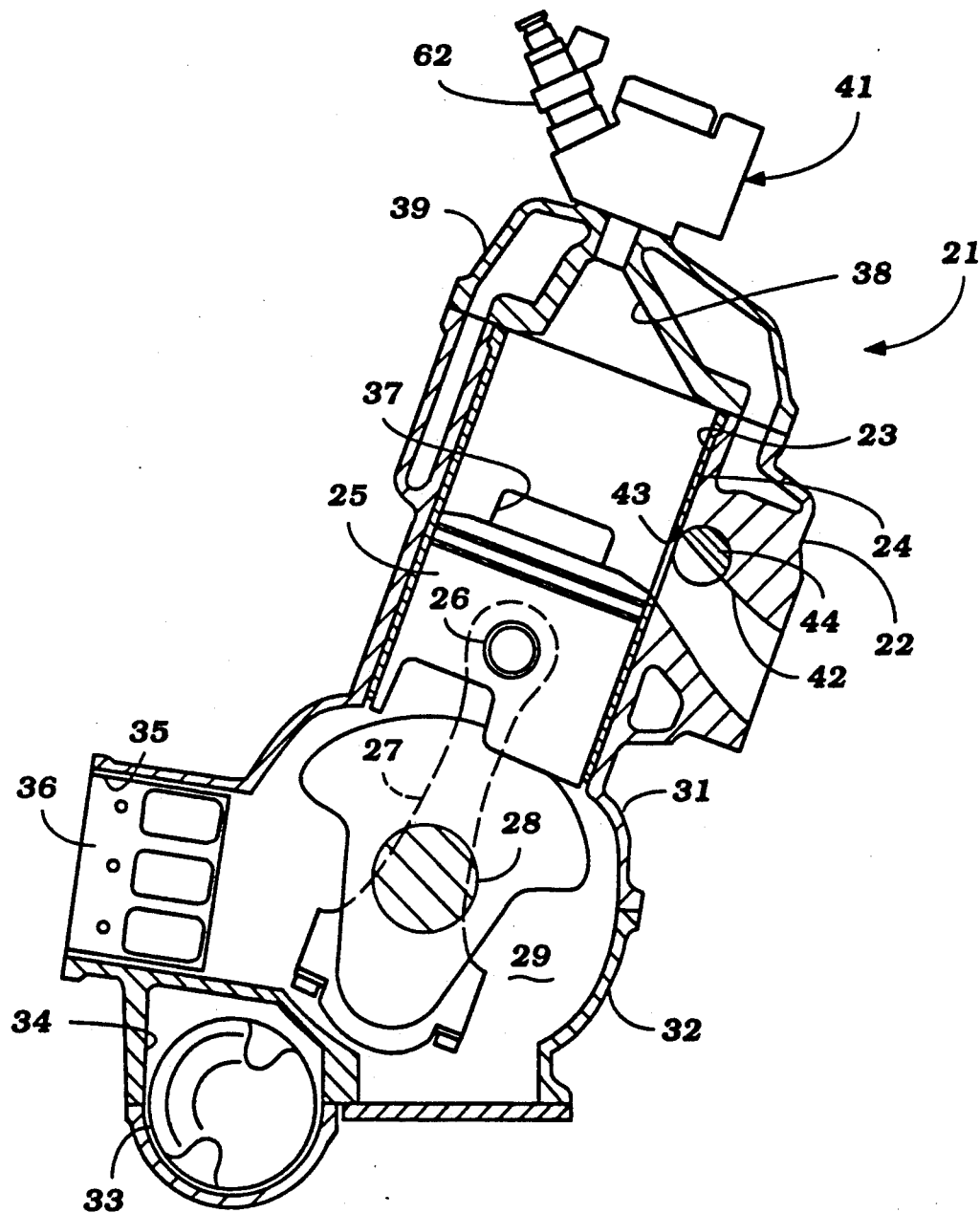
FIG. 1 is a cross sectional view taken through a single cylinder of a multiple cylinder engine having a fuel injection system constructed in accordance with an embodiment of the invention.

Referring first to the embodiment of FIG. 1 through 9 and initially only to FIG. 1, a multiple cylinder, two cycle, crankcase compression, internal combustion engine constructed in accordance with this embodiment is identified generally by the reference numeral 21. In the illustrated embodiment, the engine 21 is of the inline, three cylinder type. The construction is also such that the engine 21 is particularly adapted for an automotive application, as will become apparent. It is to be understood, of course, that the invention can be practiced with other types of engines than those operated on the two stroke, crankcase compression principal and having other cylinder numbers and configurations. Also, the invention may be practiced with other than reciprocating engines. However, it should be noted that the invention has particular utility in conjunction with two cycle, crankcase compression, spark ignited engines.

The engine 21 is comprised of a cylinder block 22 which is provided with three aligned cylinder bores 23 formed by cylinder liners 24 that are pressed or cast in place in the cylinder block 22. Because of the application of the engine 21 for automotive use and particularly with a transverse engine, front wheel drive arrangement, the cylinder block 22 is disposed so that the cylinder bores 13 are inclined rearwardly from a vertically extending plane. Of course, the invention can be employed in conjunction with other cylinder placements as should be readily apparent to those skilled in the art.

A piston 25 is slideably supported in each cylinder bore 23 and is connected by means of a piston pin 26 to the upper end of a connecting rod 27. The lower end of the connecting rod 27 is, in turn, journalled on a respective throw of a crankshaft 28. The crankshaft 28 is journalled for rotation within a crankcase chamber 29 formed by a skirt 31 of the cylinder block 22 and a crankcase member 32 that is affixed to the skirt 31 in any appropriate manner.

A balance shaft 33 is journalled for rotation within a balance shaft chamber 34 formed below the crankcase chamber 32 and driven from the crankshaft 28 in a suitable manner. Reference may be had to co-pending application of Toshikazu Ozawa entitled "Balancer Shaft For Two Cycle Engine", Ser. No. 814,803, filed Dec. 30, 1991, now U.S. Pat. No. 5,174,257 and assigned to the assignee hereof for the details of the construction and operation of the balancer shaft 33 and its manner of drive. The disclosure of that application is incorporated herein by reference.

As is typical with two cycle, crankcase compression engine practice, the portion of the crankcase chamber 29 associated with each cylinder bore 23 is sealed from the others in a suitable fashion. A intake port 35 is formed in the crankcase chamber 29 for admitting an air charge thereto from an induction system (not shown). A reed type check valve 36 is provided in the intake port 35 so that an air charge may be drawn into the crankcase chambers 29 when the pistons 25 are moving upwardly and for trapping this charge in the chambers 29 when the pistons 25 move downwardly so as to compress this charge.

The charge which has been compressed in the crankcase chambers 29 is transferred from the crankcase chambers 29 to an area above the pistons 25 through a plurality of scavenge passages 37 having a construction and orientation as will be described later by reference to FIG. 3. This area above the pistons 25 comprises a variable volume chamber which is defined by the head of the piston 25, the cylinder liner 23 and a recess 38 formed in a cylinder head assembly 39 that is affixed to the cylinder block 22 in an appropriate manner. The configuration of this chamber will be described later by particular reference to FIGS. 2 through 4.

Figure 5:
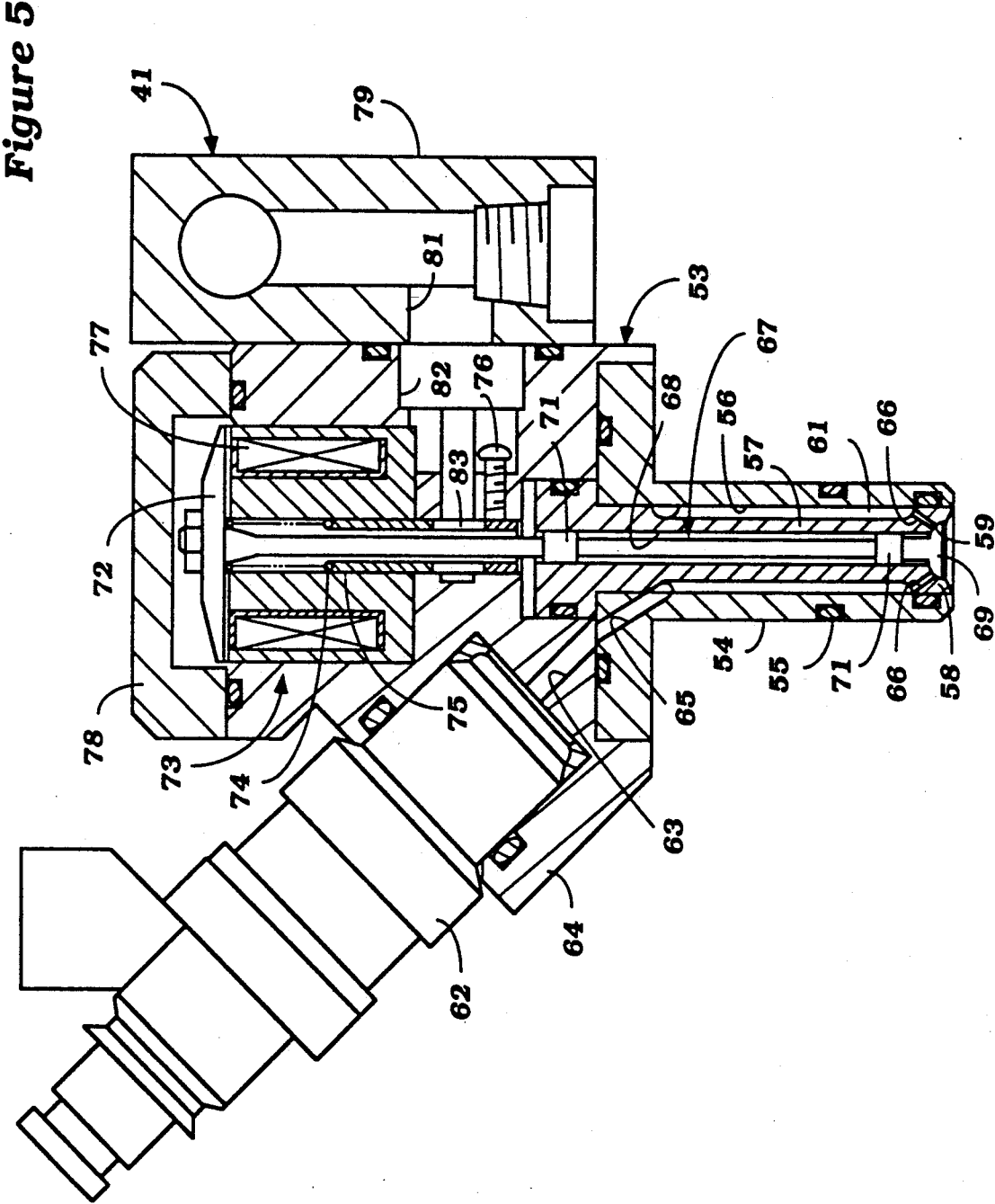
FIG. 5 is a further enlarged cross sectional view taken through the air/fuel injector.

A fuel/air charge is injected into this chamber and particularly the recess 38 by an air/fuel injector assembly, indicated generally by the reference numeral 41 and having a construction as will be best understood by reference to FIGS. 5 through 7, which will be described later. This charge is then fired by means of pair of spark plugs, also to be described later, and will then expand and drive the piston 25 downwardly.

The exhaust gases are then discharged through an exhaust passage 42 that extends from an exhaust port 43 formed in the cylinder liner 23 for discharge to the atmosphere through an exhaust system (not shown). If desired, an exhaust control valve 44 may be positioned in the exhaust passage 42 for changing the effective timing of the opening and closing of the exhaust port 43.

Figure 2:
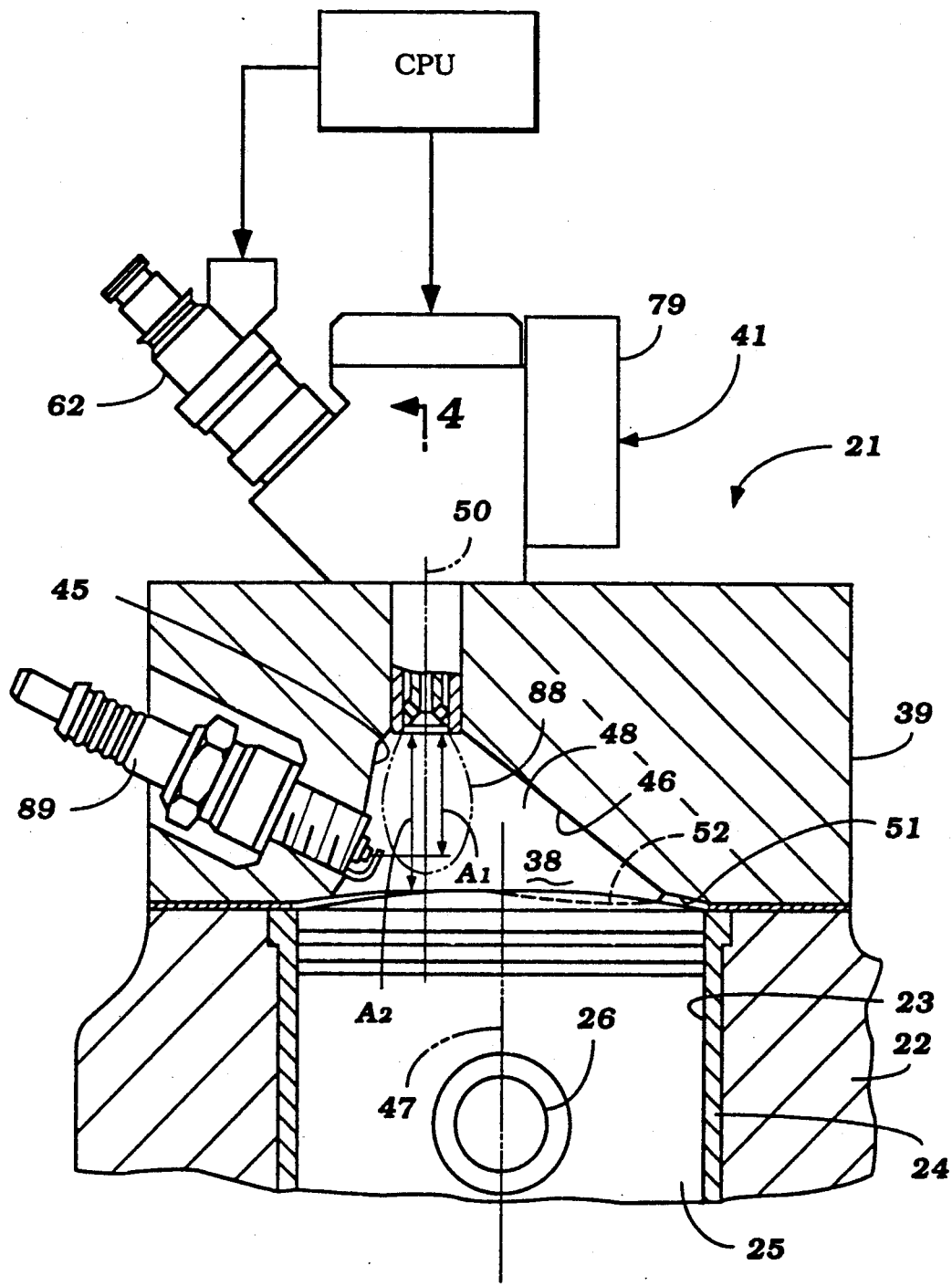
FIG. 2 is a further enlarged cross sectional view showing the combustion chamber and fuel injector of the engine.
Figure 3:
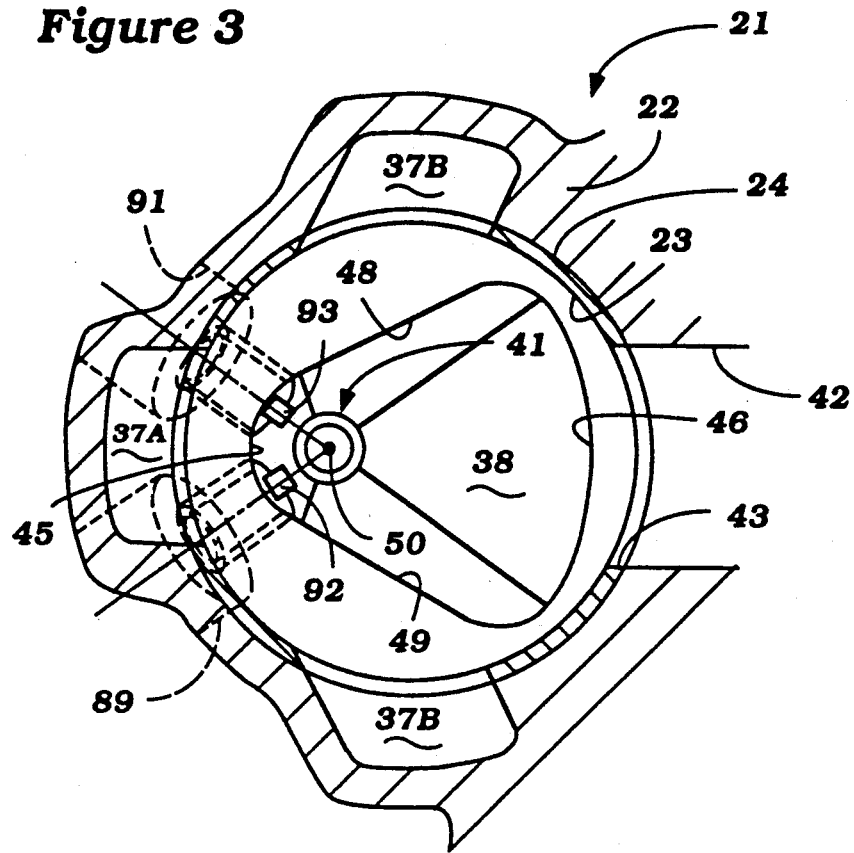
FIG. 3 is a cross sectional view taken along a plane extending perpendicular to the plane of FIG. 2 and looking toward the cylinder head with the plane passing through the ports of the engine.
Figure 4:
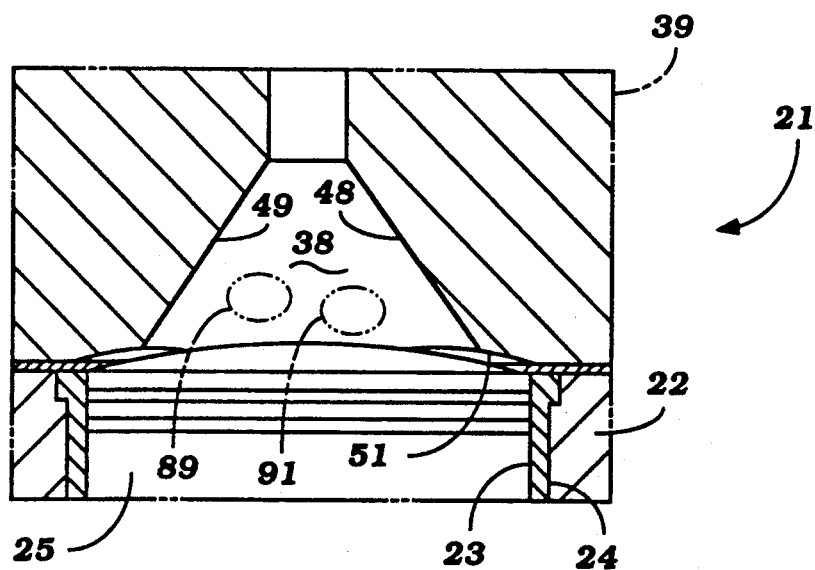
FIG. 4 is a cross sectional view taken along the line 4—4 of FIG. 2.

Referring now in detail primarily to FIGS. 2 through 4, the scavenge passages 37 are divided into a center scavenge passage 37A and a pair of side scavenge passages 37B (FIG. 3). The center scavenge passage 37A faces the exhaust port 42 while the side scavenge passage 37B are disposed approximately midway between the center scavenge passage 37A and the exhaust port 42. The scavenge passages 37A and 37B and exhaust passage 42 are disposed so as to provide a loop or Schnurle type of scavenging in the combustion chamber of the engine.

Turning now to the configuration of the combustion chamber and particularly the recess 38 and its cooperation with the remainder of the combustion chamber, the construction is generally of the type shown in co-pending application of Toshikazu Ozawa and Takafumi Fukuda, entitled "Fuel Injection System For Engine", Ser. No. 07/714,216, filed Jun. 12, 1991, now U.S. Pat. No. 5,105,795 and assigned to the assignee hereof. Basically and as may be best seen in FIGS. 2 through 4, the recess 38 is formed by a pair of walls, which are generally arcuate and which are identified by the reference numerals 45 and 46, respectively. It should be noted that the walls 45 and 46 have a different inclination to the cylinder bore axis 47 with the wall 45 being much more steeply inclined than the wall 46.

The walls 45 and 46 blend into side walls 48 and 49 which have a generally fan shape in plan view so as to provide a combustion chamber which generally expands in volume from the wall 45 toward the wall 46. The walls 45 and 46 generally intersect along a line, indicated by the phantom line and identified by the reference numeral 50. This intersecting line 50 is parallel to the cylinder bore axis 47 but offset toward the side of the main scavenge passage 37A.

As noted, the recess 38 forms a part of a combustion chamber, which is comprised of the recess 38 and the remaining area within the cylinder bore 23 and above the head of the piston 25. At top dead center, as shown in FIGS. 2 and 4, there is a small squish area 51 that generally encircles the recess 38 and which is defined around the periphery of the recess.

The head of the piston 25 may be formed with a recessed area 52 which is positioned in facing relationship to the shallowly inclined wall 46 and which has a shape that is complementary to the fan shape of the cylinder head recess 38 so as to provide an area for further gas expansion, as will be described.

At the head of the recess 38 there is provided a dome area 53 which is generally circular and which lies around the line 50. The fuel injector 41 is supported in the cylinder head 39 in an appropriate manner and has its discharge axis generally parallel and coincident with the line 50 and in a perpendicular direction to the cylinder bore 23. However, it is to be understood that the axis may be slightly inclined so as to converge toward the more steeply inclined wall 45.

In the illustrated embodiment, the fuel injector 41 is of the air fuel injector type. However, it is to be understood that the injector 41 may inject only fuel. Although, as has been noted, any form of fuel injector may be employed, the injector 41 may be an air/fuel injector of the type disclosed in copending application of Motoyama Yu, entitled "Air Fuel Injector Assembly", Ser. No. 591,960, filed Oct. 2, 1990, now U.S. Pat. No. 5,123,399 and assigned to the assignee hereof, the disclosure of which is herein incorporated by reference. Basically, the air/fuel injector 41 is comprised of a body portion, indicated generally by the reference numeral 53 that is comprised of a lower piece having a cylindrical portion 54 that is received within the bore in the cylinder head 39 formed around the line 50. An O-ring seal 55 provides a seal between the injector portion 54 and the cylinder head assembly 39.

The portion 54 has an internal bore 56 in which an insert piece 57 is positioned. The inset piece 57 has a lower enlarged portion 58 which forms a valve seat 59 having a configuration as well be discussed later in conjunction with FIGS. 6 and 7. The remainder of the insert piece 57 has a reduced diameter portion so as to provide a cavity 61 with the bore 56 to which fuel is injected from a fuel injector 62.

The fuel injector 62 may be of any known type and is electrically operated so as to inject fuel into a fuel channel 63 formed in an upper housing piece 64 and which is aligned with a fuel channel 65 formed in the lower housing piece 54 and which intersects the fuel chamber 61.

A plurality of fuel delivery ports 66 ar formed in the enlarged lower end 58 of the insert piece 57 and cooperate with the valve seat 59 in a manner which will be described.

An injection valve, indicated generally by the reference numeral 67 is slideably supported within a bore 68 formed in the insert piece 57 and has a head portion 69 that cooperates with the valve seat 59 for controlling the flow therethrough. A plurality of enlarged portions 71 which are interrupted so as to permit flow therepast engage the bore 68 so as to slideably support the injection valve 67.

The injection valve 67 has an armature 72 affixed to its upper end which forms a portion of an electromagnet or solenoid assembly, indicated generally by the reference numeral 73. A coil compression spring 74 engages a sleeve 75 held in the housing piece 64 by a set screw 76 and engages the armature 72 for urging the injection valve 67 to its closed position. A winding 77 of the solenoid 73 is held in the housing piece 64 and is enclosed by a cap 78. The winding 77 when energized will attract the armature 72 downwardly and cause the injection valve 67 to open.

In addition to injecting fuel from the fuel injector 62, the air/fuel injector 41 also injects air under pressure. This air is supplied from an air manifold 79 which receives air under pressure from suitable air compressor (not shown). This air from the manifold 79 is delivered to the injector housing 53 through a manifold port 81 that cooperates with an injector housing port 82 which, in turn, communicates through a bore 83 in the sleeve 75 with the bore 68 in which the injection valve 67 is supported. As a result of this construction, the injection valve 67 and particularly its head 69 valves both the fuel of fuel from the chamber 61 and air from the bore 68.

Figure 6:
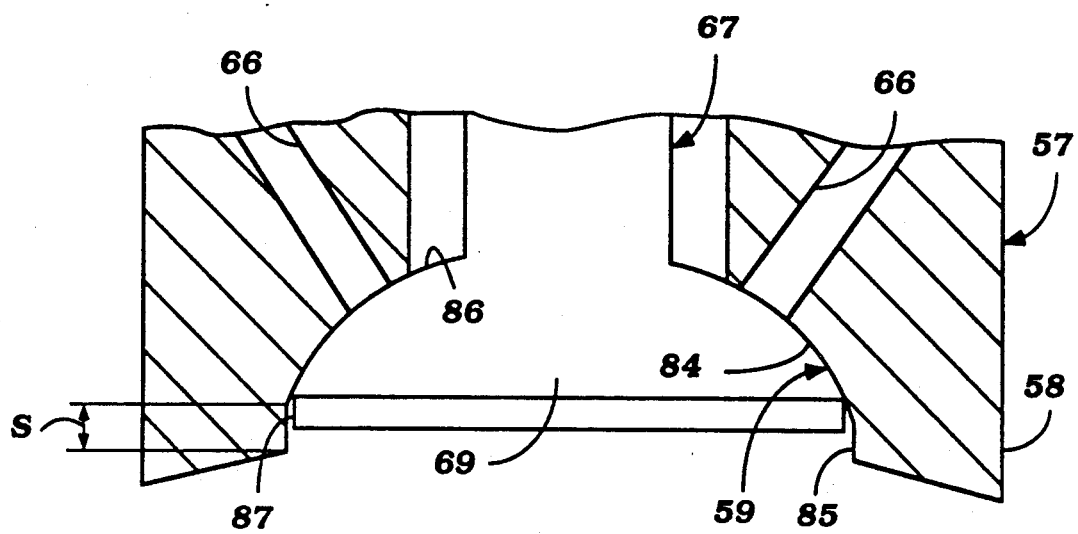
FIG. 6 is a still further enlarged cross sectional view taken through the injection valve of the fuel injector showing the injection valve in its closed position.
Figure 7:
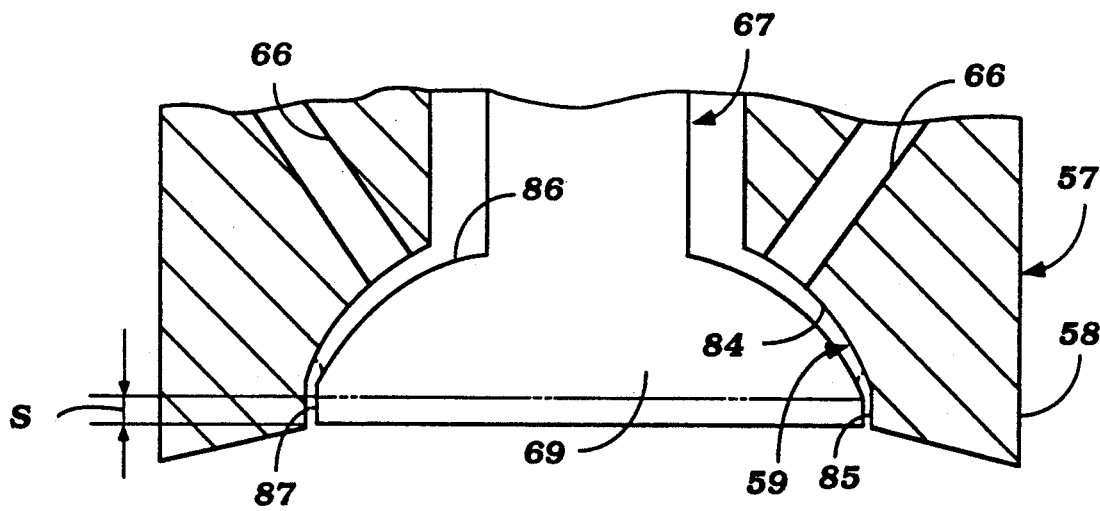
FIG. 7 is a cross sectional view, in part similar to FIG. 6, and shows the injection valve opened.

As may be seen from FIG. 6 and 7, the valve seat 59 formed by the enlarged portion 58 of the insert piece 57 is comprised of a spherical segment 84 and a cylindrical segment 85 which is generally complimentary in diameter to the peripheral edge of the spherical segment 84. The cylindrical segment 85 has a length indicated by the dimension S which, in effect, provides some shrouding action, as will be described.

The valve head 69 has a spherical section 86 that cooperates with the spherical section 84 of the valve seat 59 so as to open and close this area. The fuel port 66s cooperate with the spherical section 84 and corresponding valve section 86.

In addition, the valve head 69 has a cylindrical section 87 which is somewhat smaller in diameter than the valve seat section 85 so as to provide a gap as shown in FIG. 7 through which the air and fuel is injected when the injection valve 67 is in its open position as shown in FIG. 6. This shrouding not only defines the path in which the fuel is injected and confines it to a relatively narrow area as shown by the fuel discharge segment 88 shown in FIG. 2 but also limits the degree of penetration and the velocity of the fuel that is injected, for a reason which will become apparent.

In addition to the shrouding provided for by the valve seat 59 and valve head 69 as described, the penetration of the fuel and air into the combustion chamber recess 38 is controlled by regulating the pressure of fuel injected by the fuel injector 62 and the pressure of the air delivered to the manifold 79. In addition, a predetermined pressure differential is provided between the fuel supplied by the fuel injector 62 and the air supplied from the manifold 79. Any suitable regulating system may be employed for this purpose.

Figure 8:
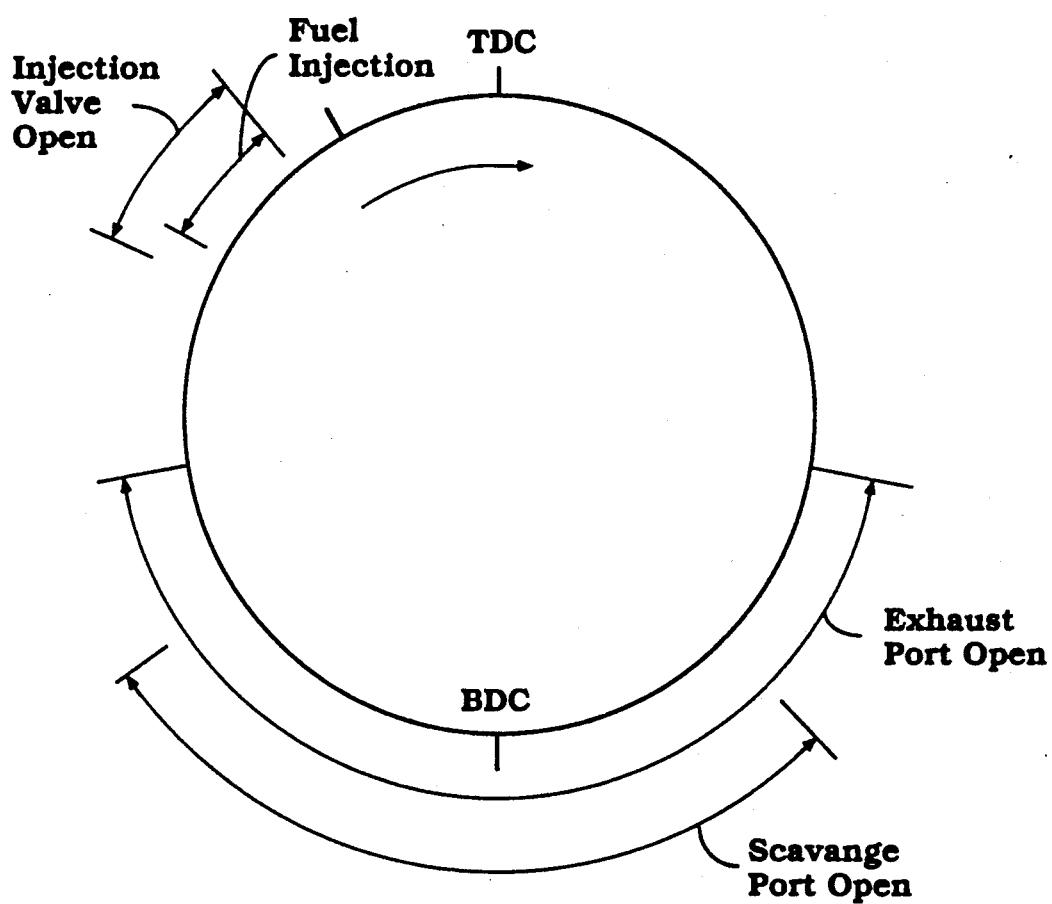
FIG. 8 is a timing diagram showing the timing of the events in the cylinder.

FIG. 8 shows a timing strategy of fuel injection from the fuel injector 62 and opening and closing of the injection valve 67 under low speed, low load conditions. As may be seen, the injection of fuel from the fuel injector 62 is not commenced until after the injection valve 67 is opened and the end of fuel injection and closing of the injection valve 67 occur at approximately the same time. As the speed and load of the engine increases, the beginning of fuel injection and the opening of the injection valve 67 will be advanced up until a certain point. Beyond that point, the timing of the fuel injection may be further advanced so that fuel delivery will occur before the injection valve 67 is opened. Of course, various other control strategies may be employed.

Referring again to FIGS. 2 and 3, a pair of spark plugs 89 and 91 are mounted in the cylinder head 39 and have their respective spark gaps 92 and 93 lying within the wall 45 of the cylinder head recess 38. As may be seen, these spark gaps 92 and 93 are disposed closely adjacent each other but at slightly different locations. In the illustrated embodiment, the spark plug 89 is mounted lower in the wall 45 than the spark plug 91. By positioning these spark plugs 89 and 91 closely to each other but at slightly different locations, it will be assured that fuel patch 88 is present next to one of the gaps 92 and 93 at the time of firing s that there will be good combustion. After the charge ignites it will expand outwardly as to flame front progresses toward the greater area of the recess 38 and thus there will be rapid flame propagation, smooth and complete combustion.

As has been previously noted, the squish area 51 will cause a squish action and the piston 25 approaches top dead center. This squish action will cause the charge to be forced into the recess 38 and will help to confine the fuel patch 88 in the area of the spark plugs 89 and 91 and specifically their spark gaps 92 and 93. However, if the squish action is too high in relation to injection velocity, the fuel patch 88 may actually be driven away from the spark gaps 92 and 93. The squish action adds to the velocity of the charge in the chamber at the time of fuel injection. In addition to the squish action, piston compression and scavenging also add to the flow velocity within the combustion chamber of the charge at the time the fuel is injected. If the fuel injection velocity is not greater than this velocity of the charge, this can affect the smoothness of engine running as may be seen in FIG. 9.

Figure 9:
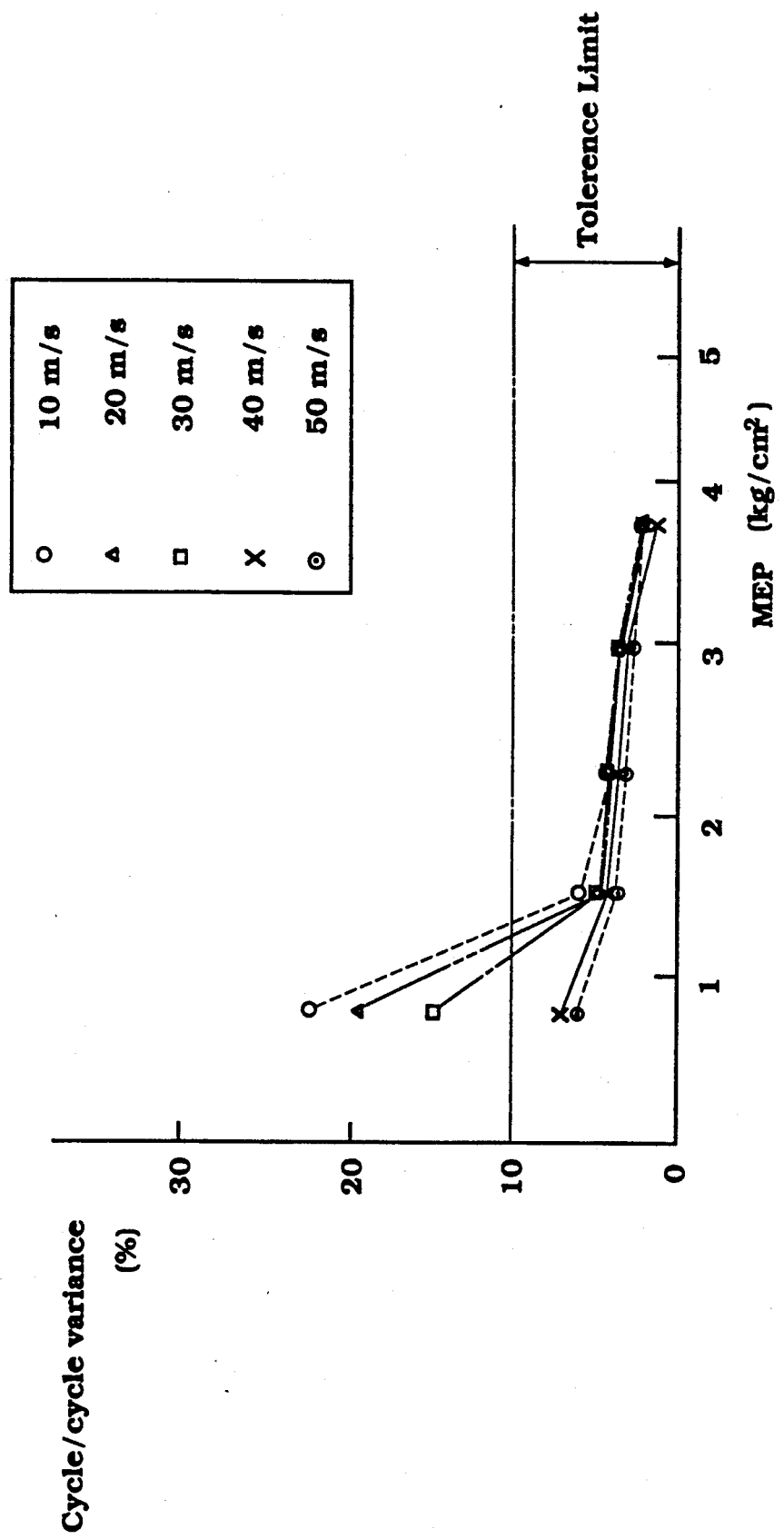
FIG. 9 is a graphical view showing the effect on cylinder to cylinder variation caused by different fuel injection velocities and pressures in relation to mean effective pressure (MEP).
Figure 10:
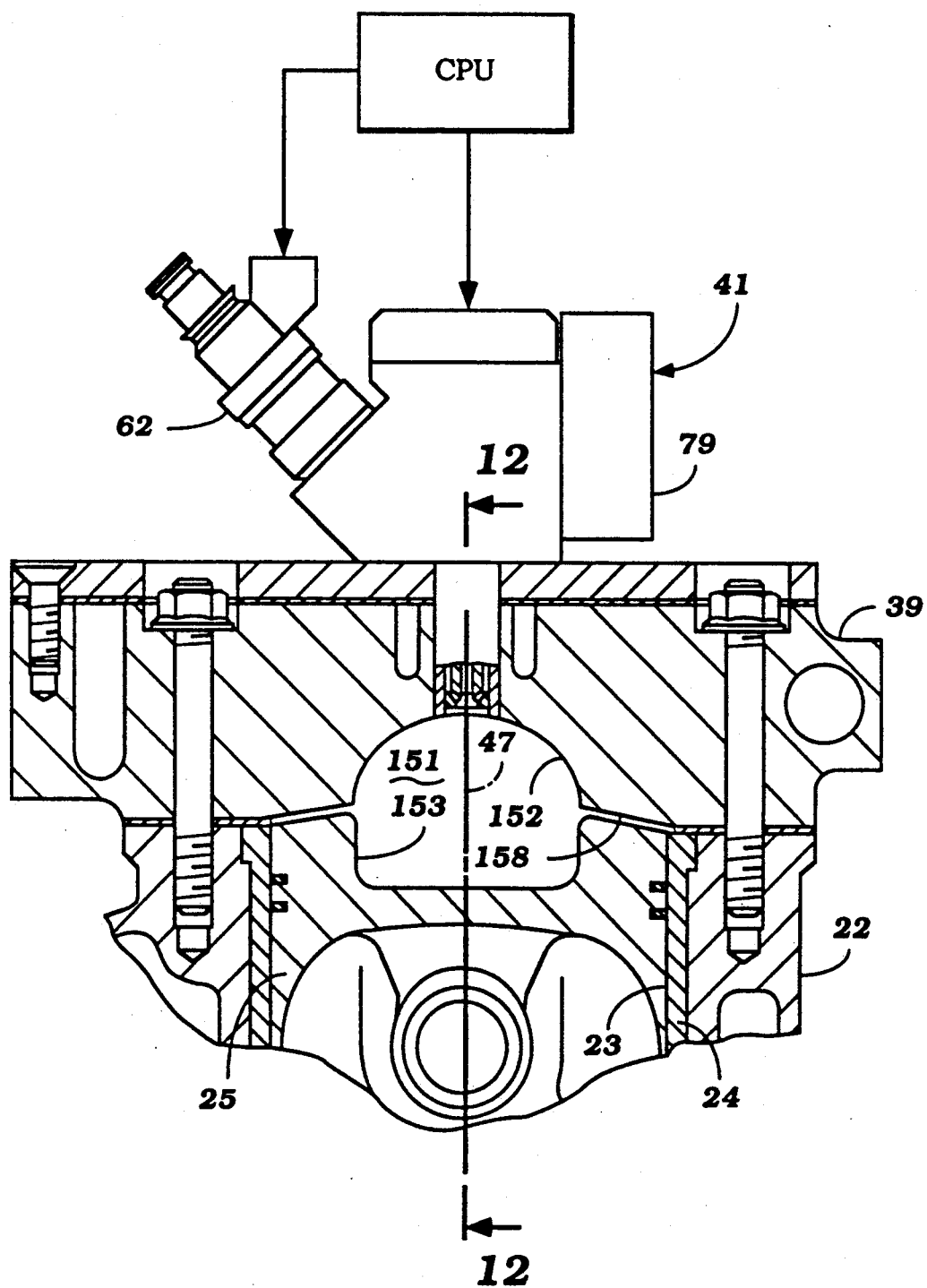
FIG. 10 is a cross sectional view, in part similar to FIG. 2, and shows another embodiment of the invention.
Figure 11:
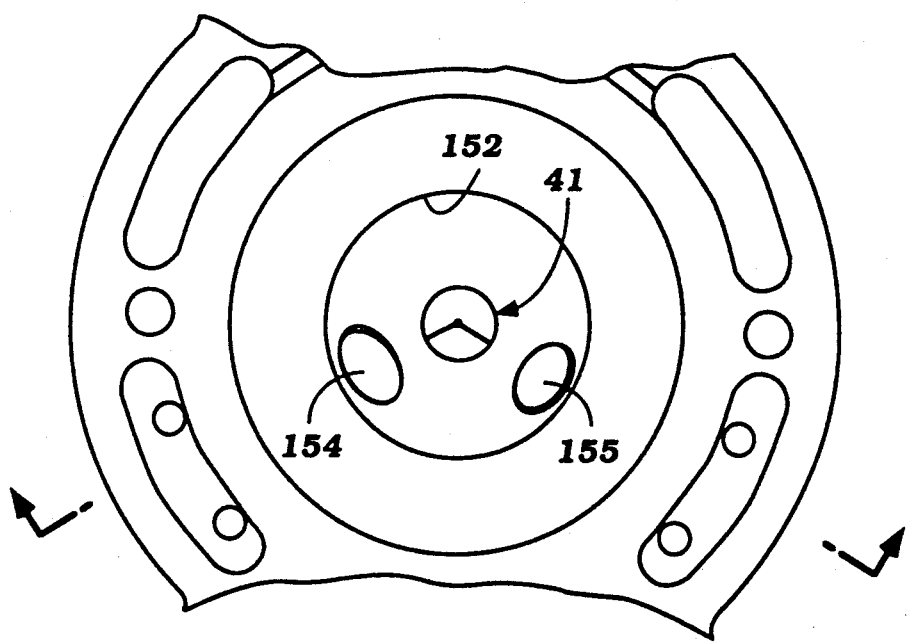
FIG. 11 is a cross sectional view, in part similar to FIG. 3, of this embodiment.
Figure 12:
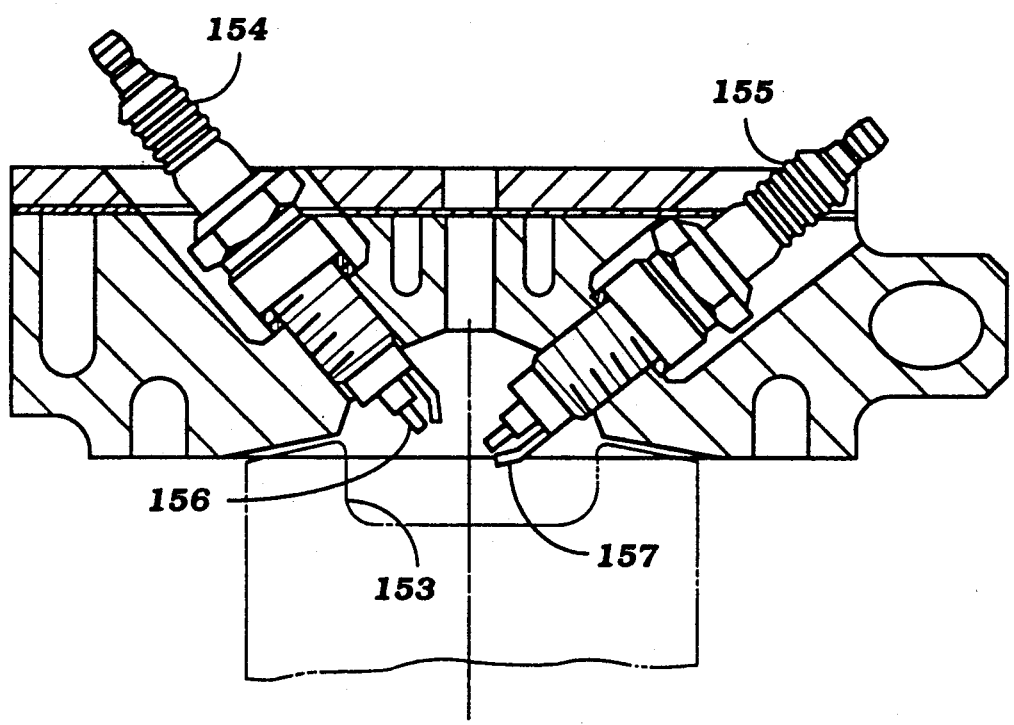
FIG. 12 is cross sectional view taken along the line 12—12 of FIG. 10.
Figure 13:
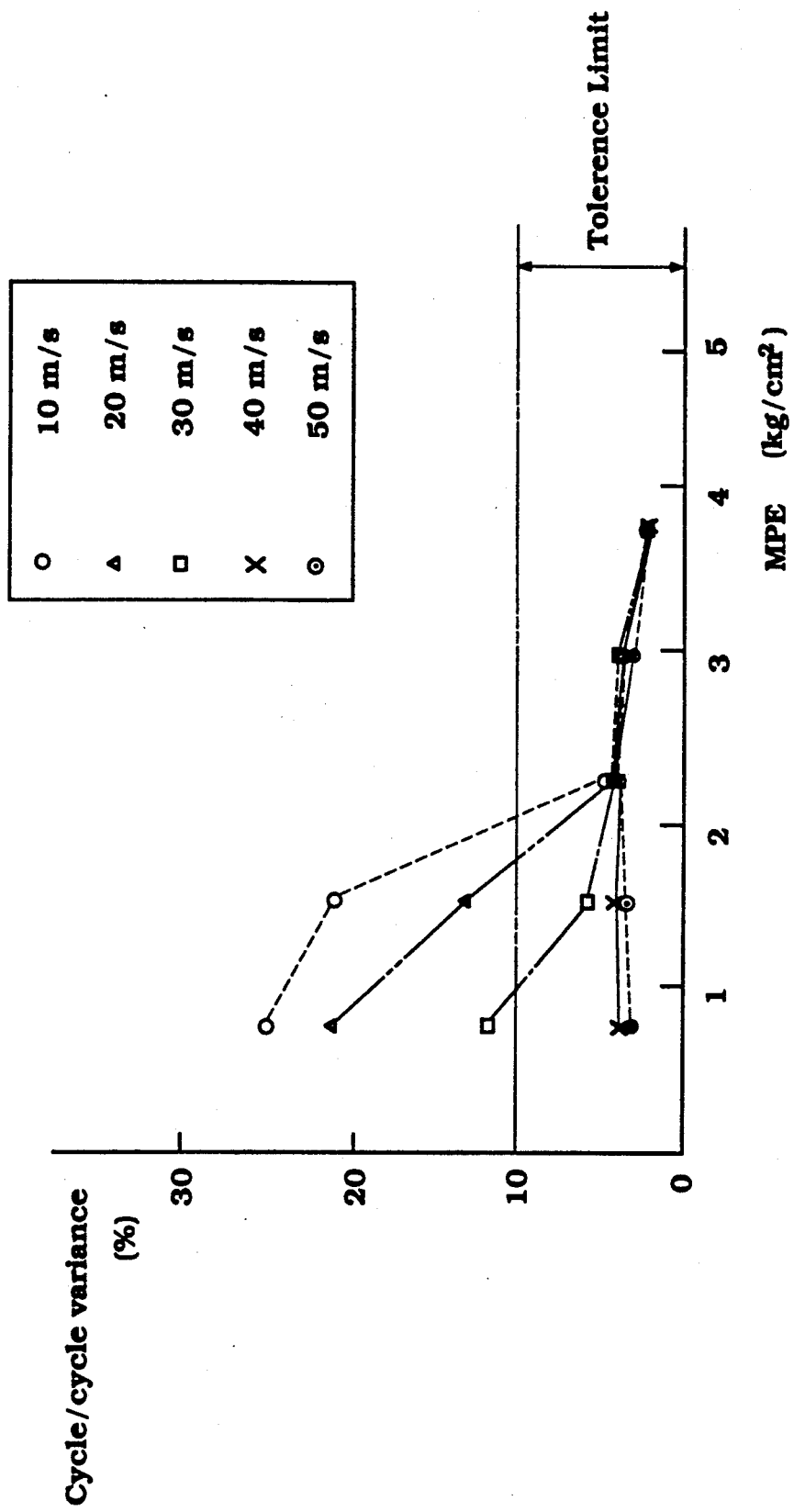
FIG. 13 is a graphical view, in part similar to the view of FIG. 9, showing the corresponding relationship for cycle to cycle variation caused by varying fuel velocities and fuel injection pressures for the embodiment of FIG. 10 through 12.

FIG. 9 is a graphical view showing cycle to cycle variation as a percentage of difference in fluctuation rate of mean effective pressure in accordance with a system as described in the SAE paper 78006, entitled "The Fast Burn With Heavy EGR, New Approach For Low NOx And Improved Fuel Economy" presented during the Congress and Exposition at Cobo Hall in Detroit, on Feb. 27 through Mar. 3, 1978. It has been found that if injection velocity is too low then cycle to cycle variation can be too large and uneven running can occur. As may be seen in FIG. 2, the spark gap distance $A_1$ should be such in relation to the fuel patch 88 that the fuel will be ignited. The fuel should not go to the penetration $A_2$ where it would impinge upon the head of the piston 25 and the family of curves in FIG. 9 shows a variety of fuel injection velocities as measured at a given point from the injector valve seat 59 in meters per second.

The family of curves are generated on a engine running at 1500 RPM under various mean effective pressures. It should be seen that when the velocity of injection is less than 40 meters per second (as measured in still air at atmospheric pressure), then the tolerance limit of 10% variance from cycle to cycle is exceeded and uneven running will occur. This velocity is also been found to be equated to the squish velocity so that the injection velocity should be greater than the velocity of the change in .the chamber caused by the squish and other actions aforenoted as the piston approaches top dead center and at least equal to or greater than 40 meters per second. As will be noted this injection velocity permits greater tolerances in combustion chamber shape, spark plug timing, etc.

FIG. 10 through 13 show another embodiment of the invention and in this embodiment is generally the same as the embodiment of FIGS. 1 through 9 and differs from the embodiment only in the shape of the combustion recess, which is indicated generally by the reference numeral 151 in this embodiment. Components which are the same or generally the same as those of the previous embodiment have been identified by the same reference numerals and will not be described again, except insofar as is necessary to understand the construction and operation of this embodiment.

In this embodiment, the combustion chamber 151 is formed by a recess 152 in the cylinder head which is generally spherical in configuration and which is aligned with the cylinder bore axis 47. The fuel injector 41 is also aligned on the cylinder bore axis 47 in this embodiment. The head of the piston 25 is also formed with a bowl shape recess 153 which is complimentary to the cylinder head recess 152 but which is not spherical but rather cylindrical in configuration.

A pair of spark plugs 154 and 155 are mounted in the cylinder head 39 and have their spark gaps 156 and 157 extending into the cylinder head recess 152. In fact, the spark gap 157 of the spark plug 155 may extend below the cylinder head recess 152 and at least in part into the piston bowl recess 153. As with the previously described embodiment, this configuration is chosen so that it will be insured that the fuel patch will be present at one of the spark gaps under all running conditions to insure good combustion.

A squish area 158 is formed between the head of the piston 25 around its recess 153 and the lower surface of the cylinder head 39 around its recess 152 so as to provide a squish action as aforenoted.

FIG. 1 shows the effect of fuel injection pressure with a combustion chamber of this configuration again at 1500 RPM and at various MEP. It should be noted that this combustion chamber has less tolerance than the previously described combustion chamber. However, as long as the fuel injection pressure and velocity are such that the injection speed is 40 meters per second or greater, there will be smooth running.

It should be readily apparent from the foregoing description that the described embodiments of the invention are extremely effective in providing smooth engine running under even extreme low speed, low load conditions. In addition, good fuel stratification can be achieved and accordingly good fuel economy and exhaust emission control are possible. Of course, the foregoing description is that of preferred embodiments of the invention and various changes and modifications may be made without departing from the spirit and scope of the invention, as defined by the appended claims.

We claim:

1. An internal combustion engine have a pair of relatively moveable components defining a variable volume chamber comprising, at minimum volume, a recess surrounded at least in part by a squish area, fuel injection means for injecting fuel into said recess and toward said squish area for combustion therein, and means for controlling the pressure of the fuel injected to maintain an injection velocity of at least 40 meters per second of the fuel injected into the chamber and an injection velocity at least equal to the velocity imported to the charge in the chamber by the squish action from said squish area, as the engine variable volume chamber approaches its minimum volume.

2. An internal combustion engine as set forth in claim 1 further including intake port means for delivering an air charge to the variable volume chamber and exhaust port means for discharging the discharge from the variable volume chamber.

3. An internal combustion engine as set forth in claim 2 further including spark plug means in the variable volume chamber for igniting the charge therein.

4. An internal combustion engine as set forth in claim 1 wherein the engine comprises a reciprocating engine and the relatively moveable components comprises a piston and cylinder block, cylinder head assembly.

5. An internal combustion engine as set forth in claim 4 further including spark plug means in the cylinder head for igniting the charge therein.

6. An internal combustion engine as set forth in claim 4 wherein the engine operates on a two stroke, crankcase compression principle.

7. An internal combustion engine as set forth in claim 1 wherein the fuel injection means comprises a fuel/air injector for injecting both fuel and air under pressure into the variable volume chamber.

8. An internal combustion engine as set forth in claim 7 wherein the engine comprises a reciprocating engine and the relatively moveable components comprises a piston and cylinder block, cylinder head assembly.

9. An internal combustion engine as set forth in claim 8 further including spark plug means in the cylinder head for igniting the charge therein.

10. An internal combustion engine comprising a pair of relatively moveable components defining a variable volume chamber comprised at its minimum volume condition by a recess and surrounded at least in part by a squish area, fuel injection means for injecting fuel into said recess for combustion herein, and means for controlling the pressure of the fuel injection to maintain an injection velocity at least equal to the velocity of the charge in the chamber caused by the squish action as the chamber approaches its minimum volume condition.

11. An internal combustion engine as set forth in claim 10 wherein the fuel injection means comprises a fuel/air injector for injecting both fuel and air under pressure into the recess.

12. An internal combustion engine as set forth in claim 10 wherein the engine comprises a reciprocating engine and the relatively moveable components comprises a piston and cylinder block, cylinder head assembly.

13. An internal combustion engine as set forth in claim 12 wherein the fuel injection means comprises a fuel/air injector for injecting both fuel and air under pressure into the recess.

14. An internal combustion engine as set forth in claim 13 further including spark plug means in the recess for igniting the charge therein.

15. A method of operating an internal combustion engine have a pair of relatively moveable components defining a variable volume chamber comprising, at minimum volume, a recess surrounded at least in part by a squish area, fuel injection means for injecting fuel into said recess toward said squish area for combustion therein, said method comprising the step of controlling the pressure of the fuel injected to maintain an injection velocity of at least 40 meters per second of the fuel injected into the cylinder and an injection velocity at least equal to the velocity of the charge in the chamber created by the squish action as the engine variable volume chamber approaches its minimum volume.

16. A method of operating an internal combustion engine comprising a pair of relatively moveable components defining a variable volume chamber comprised at its minimum volume condition by a recess and surrounded at least in part by a squish area, fuel injection means for injecting fuel into said chamber for combustion therein, and said method comprising the steps of controlling the pressure of the fuel injection to maintain an injection velocity at least equal to the velocity of the charge in the chamber caused by the squish action as the chamber approaches its minimum volume condition.

17. A method of operating an internal combustion engine as set forth in claim 16 wherein the fuel injection means comprises a fuel/air injector for injecting both fuel and air under pressure into the variable volume chamber.

18. A method of comprising an internal combustion engine as set forth in claim 16 wherein the engine comprises a reciprocating engine and the relatively moveable components comprises a piston and cylinder block, cylinder head assembly.

19. A method of comprising an internal combustion engine as set forth in claim 18 wherein the fuel injection means comprises a fuel/air injector for injecting both fuel and air under pressure into the variable volume chamber.

20. A method of comprising an internal combustion engine as set forth in claim 19 further including the steps of igniting the charge by a spark plug means in the variable volume chamber.

* * * * *